UNITED STATES PATENT OFFICE.

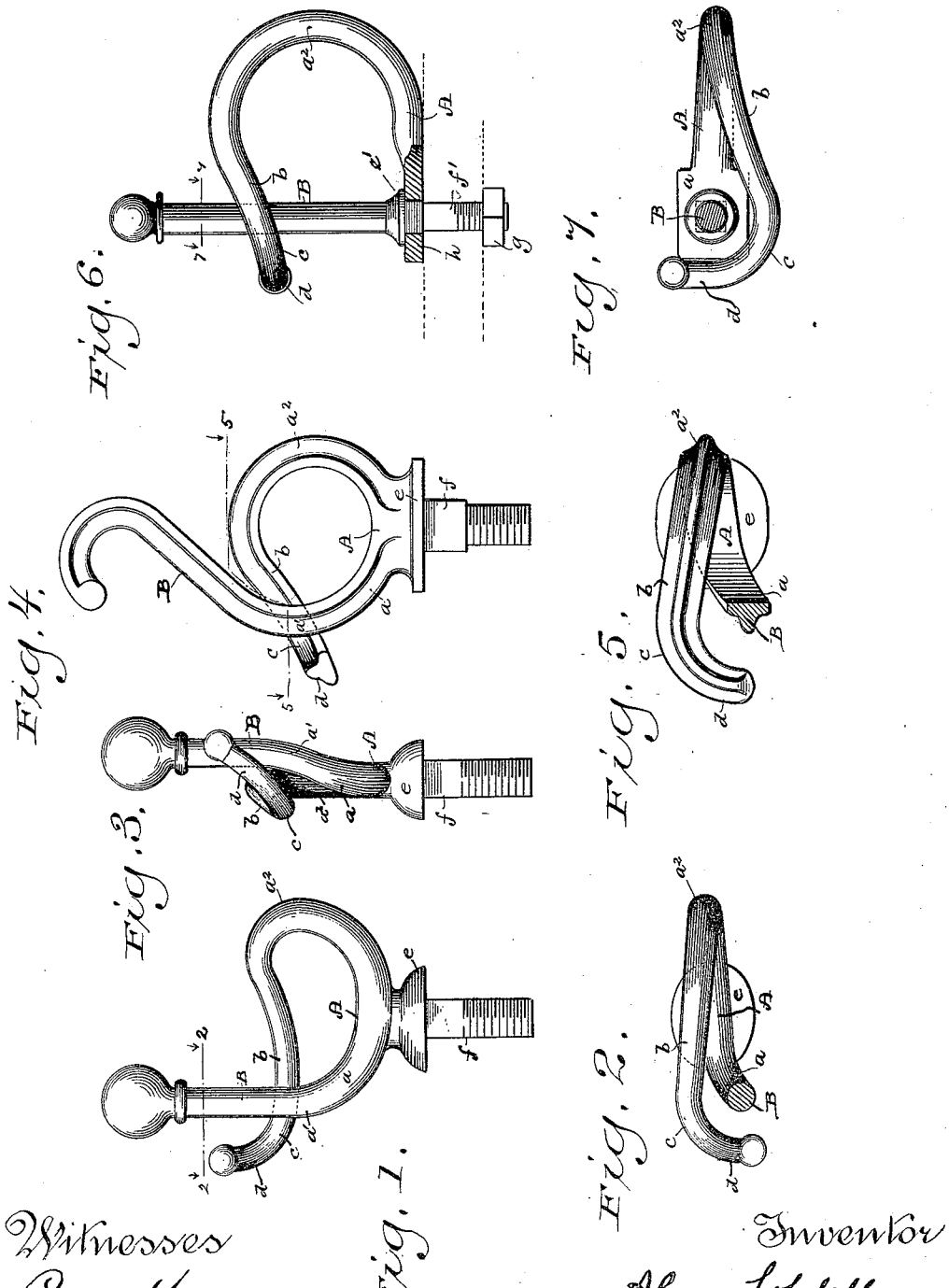

ALONZO LOBDELL, OF RACINE, WISCONSIN.

CHECK-HOOK.

SPECIFICATION forming part of Letters Patent No. 438,380, dated October 14, 1890.

Application filed May 26, 1890. Serial No. 353,249. (No model.)

*To all whom it may concern:*

Be it known that I, ALONZO LOBDELL, of Racine, in the county of Racine, and in the State of Wisconsin, have invented certain new and useful Improvements in Check-Hooks; and I do hereby declare that the following is a full, clear, and exact description thereof.

My invention relates to that class of harness attachments which are secured to the gig-saddles, and which serve to removably hold the rear end or bend of the bearing-rein, so as to compel the animal to keep his head erect; and the invention consists in certain peculiar and novel features of construction and arrangement, as hereinafter described, and pointed out in the appended claim.

In order that my invention may be fully understood, I will proceed to describe it with reference to the accompanying drawings, in which—

Figure 1 is a side elevation of one form of my improved check-hook. Fig. 2 is a top view of the same, the upright end of the device being shown in horizontal section on the line 2 2 of Fig. 1. Fig. 3 is a rear elevation of the same. Fig. 4 is a side elevation of a modified form of the check-hook. Fig. 5 is a top view of the same, partly in irregular horizontal section, on the line 5 5 of Fig. 4. Fig. 6 is a view mainly in side elevation, but partially in vertical cross-section, of a further modification in the form of a check-hook. Fig. 7 is a top view of the same, partly in horizontal cross-section, on the line 7 7 of Fig. 6.

Previous to my present invention various attempts have been made to produce a check-hook which, while securely holding the bearing-rein against being accidentally detached by the animal, should permit ready intentional attachment or detachment of the bearing-rein.

The object of my invention is to produce a check-hook which shall permit the end or bend of the bearing-rein to be readily connected to and detached from the hook and at the same time absolutely prevent the animal from disconnecting the rein, and this result I attain by virtue of the construction which I shall now proceed to describe.

Referring to Figs. 1 to 5, both inclusive, A designates a bar which forms the body of the check-hook, and which is bent or curved upward at $a$, and prolonged thence in practically vertical form to constitute the keeper B. In Figs. 1, 2, and 3 the keeper B is shown as almost straight, excepting a slight lateral bend at $a'$, while in Figs. 4 and 5 the keeper B is shown as of approximately S shape, such form being principally for ornamental effect. At the point $a^2$ the body-piece A is bent or curved into U form, and extended thence toward and beyond one side of the keeper B, as shown at $b$. From the rear end of the extension $b$ the body portion A is bent laterally, as indicated at $c$, and its end $d$ is carried across the rear side of the keeper B. In Figs. 1, 2, and 3 the portion $b$ is nearly horizontal, while in Figs. 4 and 5 said part is more inclined downward toward the base of the device, the result being that the bend $c$ in the former instance passes the keeper at a higher point than it does in the latter instance. It will also be seen that in Figs. 1, 2, and 3 the end $d$ extends obliquely upward across the rear side of the keeper B, while in Figs. 4 and 5 said part $d$ crosses the rear side of the keeper B in nearly a horizontal plane. It is to be observed, however, that in both instances above described the portion $d$ extends transversely to a line drawn from front to rear through the keeper B, and this constitutes an essential element of my present invention, since it is this peculiar relative position of the end $d$ of the hook and the keeper B which prevents accidental disconnection of the bearing-rein, while permitting its ready voluntary attachment to and detachment from the check-hook.

In the figures above described a base $e$ is shown as formed on the lowest part of the body A, and pendent therefrom is a screw-threaded stem $f$. These parts are not vitally essential to my invention, but are shown as a means for properly attaching the hook to the gig-saddle, the stem $f$ passing downward into the latter and receiving a nut, such as shown at $g$ in Fig. 6, to retain the device upon said saddle.

In Figs. 6 and 7 I have illustrated a modified form of check-hook, which is better adapted for use upon single harness than those shown in preceding figures, the latter being more especially designed for double harness. In Figs. 6 and 7 the body portion A is shown as having bends $a^2$, $b$, and $c$, and end portion $d$, similar to like parts in the preceding figures; but at its lower part the said body portion terminates in a flat plate $h$, having an eye formed through it vertically. The keeper B is in this instance a perfectly-straight separate bar having an enlargement $e'$ at its lower portion to rest on the upper side of plate $h$, and continued thence downward in reduced form, as shown at $f'$. This reduced portion passes through the plate $h$, when the parts are in operative relation with each other, and is designed to pass through the gig-saddle, the lower end being screw-threaded to receive the nut $g$, which retains the check-hook upon the saddle. The double-harness hooks are to be made in pairs, the end $d$ of one hook curving around the keeper B from one side, and the corresponding part of the other hook curving around the keeper from the opposite side.

It will be seen from the above description that in order to connect the end or bend of the bearing-rein to the check-hook it is only necessary to place said end or bend beneath the end $d$ of the hook proper, when it will instantly work along the hook till it rests upon the bend $a^2$. No amount of tossing or swaying of the animal's head can detach the bearing-rein from the hook, because if the end or bend of the rein works backward toward the end $d$ of the keeper B it is thereby prevented from slipping off of the hook. In order to detach the bearing-rein from the hook, it is only necessary to give a slight turn to the end or bend of the rein, so as to clear the keeper B, when the rein will easily slip off the hook.

Having thus described my invention, what I claim as new therein, and desire to secure by Letters Patent, is—

An improved check-hook comprising an upright member and a hook member, the latter extending forward toward and then curved to extend laterally across in front of and approximately transversely to the axial line of the upright member, substantially as set forth.

In testimony that I claim the foregoing I have hereunto set my hand, at Milwaukee, in the county of Milwaukee and State of Wisconsin, in the presence of two witnesses.

ALONZO LOBDELL.

Witnesses:
   H. G. UNDERWOOD,
   LAWSON SCOTT.